(12) United States Patent
Farrugia et al.

(10) Patent No.: US 10,498,864 B1
(45) Date of Patent: *Dec. 3, 2019

(54) SYSTEM AND METHOD FOR SELECTING CONNECTION MODE BETWEEN A CLIENT AND A SERVER

(71) Applicant: Parallels International GmbH, Schaffhausen (CH)

(72) Inventors: Daniel Farrugia, Sliema (MT); Nikolay Dobrovolskiy, Moscow (RU); Serguei M Beloussov, Costa Del Sol (SG)

(73) Assignee: PARALLELS INTERNATIONAL GMBH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,377

(22) Filed: Feb. 25, 2019

Related U.S. Application Data (63) Continuation of application No. 15/369,127, filed on Dec. 5, 2016, now Pat. No. 10,270,888.

(51) Int. Cl.
| | |
|---|---|
| *G06F 15/16* | (2006.01) |
| *H04L 29/06* | (2006.01) |
| *H04L 29/08* | (2006.01) |
| *H04L 12/66* | (2006.01) |
| *H04L 29/12* | (2006.01) |

(52) U.S. Cl.
CPC ............. *H04L 67/42* (2013.01); *H04L 12/66* (2013.01); *H04L 61/1511* (2013.01); *H04L 67/18* (2013.01); *H04L 67/28* (2013.01); *H04L 61/1541* (2013.01); *H04L 61/2076* (2013.01)

(58) Field of Classification Search
CPC ......... H04L 67/42; H04L 67/18; H04L 67/28; H04L 12/66; H04L 61/1511; H04L 61/1541; H04L 61/2076
See application file for complete search history.

(56) References Cited

U.S. PATENT DOCUMENTS

| | | | |
|---|---|---|---|
| 7,779,130 B1* | 8/2010 | Toutonghi | H04L 67/06 709/227 |
| 9,141,483 B1* | 9/2015 | Sekar | G06F 16/178 |
| 2005/0125511 A1* | 6/2005 | Hunt | H04L 12/5692 709/220 |
| 2011/0191484 A1* | 8/2011 | Babbar | G06F 9/5011 709/228 |

(Continued)

*Primary Examiner* — Jonathan A Bui
(74) *Attorney, Agent, or Firm* — Arent Fox LLP; Michael Fainberg (57) ABSTRACT

Disclosed are system and method for selecting a connection mode between a client device and a server device. An example method includes receiving a request from a client device to access one or more desired server devices, detecting a location of the client device and a location of the one or more desired server devices in a communication network, selecting a connection mode for the client device to access the one or more desired server devices based on the location of the client device and the one or more desired server devices, in response to a direct connection mode being selected, informing the client device to access the one or more desired server devices directly and in response to an indirect connection mode being selected, establishing a proxy connection between the client device and the one or more desired server devices.

20 Claims, 8 Drawing Sheets

(56) References Cited

U.S. PATENT DOCUMENTS

| | | | | |
|---|---|---|---|---|
| 2015/0039723 A1* | 2/2015 | Williams | ............... | H04W 40/02 709/217 |
| 2015/0207846 A1* | 7/2015 | Famaey | ................. | H04L 67/02 709/219 |
| 2015/0341367 A1* | 11/2015 | Kus | ..................... | H04L 63/102 726/1 |
| 2016/0100023 A1* | 4/2016 | Kim | ..................... | H04L 67/28 709/227 |
| 2016/0119348 A1* | 4/2016 | Kus | ..................... | H04L 63/10 726/1 |
| 2017/0249831 A1* | 8/2017 | Wengrovitz | ............ | H04W 4/80 |

* cited by examiner

SYSTEM AND METHOD FOR SELECTING CONNECTION MODE BETWEEN A CLIENT AND A SERVER

CROSS-REFERENCE TO RELATED APPLICATIONS

This Application is a continuation of application Ser. No. 15/369,127, filed Dec. 5, 2016, which is incorporated by reference herein.

FIELD OF TECHNOLOGY

The present disclosure generally relates to the field of configuring a client device to communicate with a server device, and, more specifically, to a system and method for selecting a connection mode between a client device and a server device.

BACKGROUND

Figure 1:
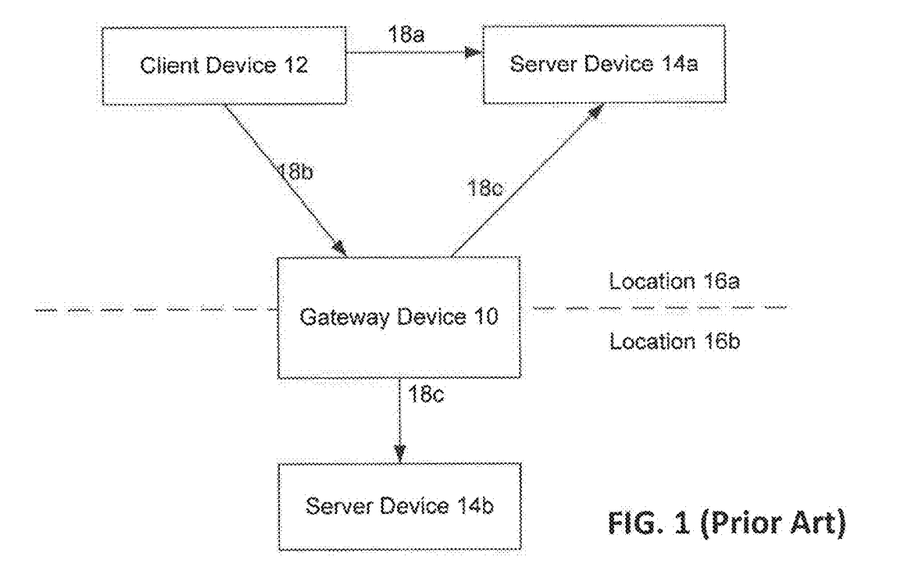
FIG. 1 illustrates a system for connecting a client device to a server device within one or more communication networks.

Generally, in a client-server system, client devices may make requests which are responded to by a server. For example, if a client device desires certain data from a database, it may transmit a request to a server device, which furnishes the information to the client device. Referring to FIG. 1, a connection mode (generally refers to means for communicating with other computing devices) of a client device 12 may need to be manually configured before the client device 12 can communicate with a server device (e.g., server devices 14a and 14b). The correct configuration may depend on whether the server devices 14a or 14b may be directly accessible via a communication link from a current location of the client device 12. As shown, the client device 12 may directly access the server device 14a from its current location 16a via a connection 18a. However, the server device 14b may not be directly accessible by the client device 12, and a gateway device 10 may be used to enable a connection 18b from the client device 12 to the gateway device 10, and a connection 18c from the gateway device 10 to the server device 14b which is located in location 16b.

Once configured, the connection mode setting of the client device 12 generally remains static regardless from which locations 16a or 16b the client device 12 is connecting. To reduce latency, it may be desirable for the client device 12 to communicate directly with the server device 14a via the connection 18a. As noted above, when the client device 12 is connecting from an isolated location 16a, a direct connection to the server device 14b may not be possible and the client device 12 may need to connect through the gateway device 10.

It may be possible to configure the client device 12 to always connect via the connection 18b through the gateway device 10 to any desired server devices. This, however, may result in that a communication with the server device 14 can be established regardless from which location 16a or 16b the client device 12 is connecting. As shown in FIG. 1, connecting via 18b through the gateway device 10 may not be the optimal choice when a direct connection 18a is possible.

One of the major disadvantages of using the gateway device 10 is that latency may be increased and that a point of failure may be introduced. If the gateway device 10 for any reasons becomes inoperative, all connections 18b and 18c passing through it may become lost and new connections may not be established in a timely manner. Therefore, it may be desirable to limit the use of the gateway device 10 where its use is not strictly required.

Accordingly, there is a need for a system and method for selecting a connection mode and communicating between a client device and a server device based on the dynamic devices and network conditions (e.g., the current locations of both the client and server devices).

SUMMARY

The present disclosure provides an effective solution for the foregoing problems by providing systems, methods and computer readable media for selecting a connection mode between a client device and a server device.

In one aspect, an exemplary method for selecting a connection mode between a client device and a server device, comprising: receiving, by a processor of a gateway device deployed within a communication network, a request from a client device for accessing at least one desired server device; detecting, by the processor, a location of the client device and a location of the desired server device in the communication network; selecting, by the processor, a connection mode for the client device to access the at least one desired server device based at least in part on the locations of the client device and the desired server, wherein the connection mode includes at least one of a direct connection between the client device and the desired server device and an indirect connection via the gateway device between the client device and the desired server device; when the direct connection mode is selected, informing the client device to access the desired server device directly; and when the indirect connection mode is selected, establishing, by the gateway device, a proxy connection between the client device and the desired server device.

In another aspect, the method includes determining, by the processor, whether the connection mode is to be cached for the client device communicating with other server devices within the communication network, or whether a new query is required to be sent by the client device to the gateway device for each of the other server devices; and informing the client device whether the selected connection mode can be cached for communicating with other server devices in the communication network or whether a new query needs to be sent for each server device in the communication network.

In another aspect, the method includes detecting, by the processor, location changes of the client device by at least detecting network interfaces or virtual LANs via which the request is received from the client device, or extracting at least one network address from a source IP address or a destination IP address of the direct or indirect connection.

In another aspect, the method includes determining, by the processor, whether the connection mode is to be cached for the client device communicating with other server devices within the communication network, or whether a new query is required to be sent by the client device to the gateway device for each of the other server devices; in response to detecting that the client device attempts to access one of the other server devices co-located with the client device within a selected area of the communication network, instructing the client device to communicate with the one of the other server devices using the direct connection mode; and in response to detecting that the client device attempts to access one of the other server devices that locate in a different location area of the communication network than that of the client device, instructing the client device to communicate with the one of the other server devices via the gateway device.

In another aspect, the method includes receiving an assigned address, by the processor, for each location from which the gateway device accepts a connection, wherein the client device is configured to obtain the assigned address of the gateway device from the location of the client device via a directory service or service discovery protocols.

In another aspect, a system for selecting a connection mode between a client device and a server device is disclosed. The system includes an electronic memory of a gateway device deployed within a communication network; and a hardware processor couple to the electronic memory and configured to: receive a request from a client device for accessing at least one desired server device; detect a location of the client device and a location of the desired server device in the communication network; select a connection mode for the client device to access the at least one desired server device based at least in part on the locations of the client device and the desired server, wherein the connection mode includes at least one of a direct connection between the client device and the desired server device and an indirect connection via the gateway device between the client device and the desired server device; when the direct connection mode is selected, inform the client device to access the desired server device directly; and when the indirect connection mode is selected, establish, by the gateway device, a proxy connection between the client device and the desired server device.

In another aspect, a non-transitory computer readable medium storing computer executable instructions for selecting a connection mode between a client device and a server device is disclosed. The instructions are configured for: receiving, by a processor of a gateway device deployed within a communication network, a request from a client device for accessing at least one desired server device; detecting, by the processor, a location of the client device and a location of the desired server device in the communication network; selecting, by the processor, a connection mode for the client device to access the at least one desired server device based at least in part on the locations of the client device and the desired server, wherein the connection mode includes at least one of a direct connection between the client device and the desired server device and an indirect connection via the gateway device between the client device and the desired server device; when the direct connection mode is selected, informing the client device to access the desired server device directly; and when the indirect connection mode is selected, establishing, by the gateway device, a proxy connection between the client device and the desired server device.

Moreover, in one aspect, an exemplary method for determining a connection mode between a client device and a server device, the method comprising: checking a memory of the client device to determine whether information about a connection mode for accessing one or more server devices is cached, wherein the connection mode includes at least one of a direct connection between the client device and a server device, and an indirect connection via a gateway device between the client device and the server device; determining whether a location of the client device has changed; in response to detecting that: no connection mode has been cached, or the connection mode has been cached and a location of the client device has changed, identifying the gateway device and transmitting a query to the gateway device to obtain the information about the connection mode; and in response to detecting that: the connection mode has been cached and the location of the client device has not changed, or the information about the connection mode is obtained from the gateway device, connecting with the at least one desired server device using the determined connection mode.

In another aspect, the method further includes: communicating with the at least one desired server device for the first time using the determined connection mode; and continuing using the determined connection mode for subsequent communications with the at least one desired server device with no location changes.

In another aspect, the server device is a domain name system (DNS) server which uses a directory service, and the method further includes obtaining the address of the gateway device using service discovery protocols including multicast domain name system (mDNS) protocols.

In another aspect, a system for determining a connection mode between a client device and a server device is disclosed. The system comprises: an electronic memory of a client device located within a communication network; and a hardware processor couple to the electronic memory and configured to: check a memory of the client device to determine whether information about a connection mode for accessing one or more server devices is cached, wherein the connection mode includes at least one of a direct connection between the client device and a server device and an indirect connection via a gateway device between the client device and the server device; determine whether a location of the client device has changed; in response to detecting that: no connection mode has been cached, or the connection mode has been cached and a location of the client device has changed, identify the gateway device and transmitting a query to the gateway device to obtain the information about the connection mode; and in response to detecting that: the connection mode has been cached and the location of the client device has not changed, or the information about the connection mode is obtained from the gateway device, connect with the at least one desired server device using the determined connection mode.

In another aspect, a non-transitory computer readable medium storing computer executable instructions for determining a connection mode between a client device and a server device is disclosed. The instructions are configured for: checking a memory of the client device to determine whether information about a connection mode for accessing one or more server devices is cached, wherein the connection mode includes at least one of a direct connection between the client device and a server device and an indirect connection via a gateway device between the client device and the server device; determining whether a location of the client device has changed; in response to detecting that: no connection mode has been cached, or the connection mode has been cached and a location of the client device has changed, identifying the gateway device and transmitting a query to the gateway device to obtain the information about the connection mode; and in response to detecting that: the connection mode has been cached and the location of the client device has not changed, or the information about the connection mode is obtained from the gateway device, connecting with the at least one desired server device using the determined connection mode.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Disclosed herein are exemplary aspects of systems, methods and computer program products for selecting a connection mode and communicating between a client device and a server device. As referred herein, a client device may be a device which communicates with server devices, and a server may be a device which accepts connections from one or more client devices and provides requested services and information. Further, a gateway device may include devices that act as a proxy between client and server devices based at least on a determined connection mode between the client and server devices. Here, a connection mode may include a connection setting on a client device which determines whether the client device should connect directly to a server device or pass through at least one gateway device for ultimately connecting with a server device. Various aspects of invention will be described with reference to the drawings, wherein like reference numerals are used to refer to like elements throughout. In the following description, for purposes of explanation, numerous specific details are set forth in order to promote a thorough understanding of one or more aspects of the invention. It may be evident in some or all instances, however, that any aspects described below can be practiced without adopting the specific design details described below. In other instances, well-known structures and devices are shown in block diagram form in order to facilitate description of one or more aspects of the invention.

Figure 2:
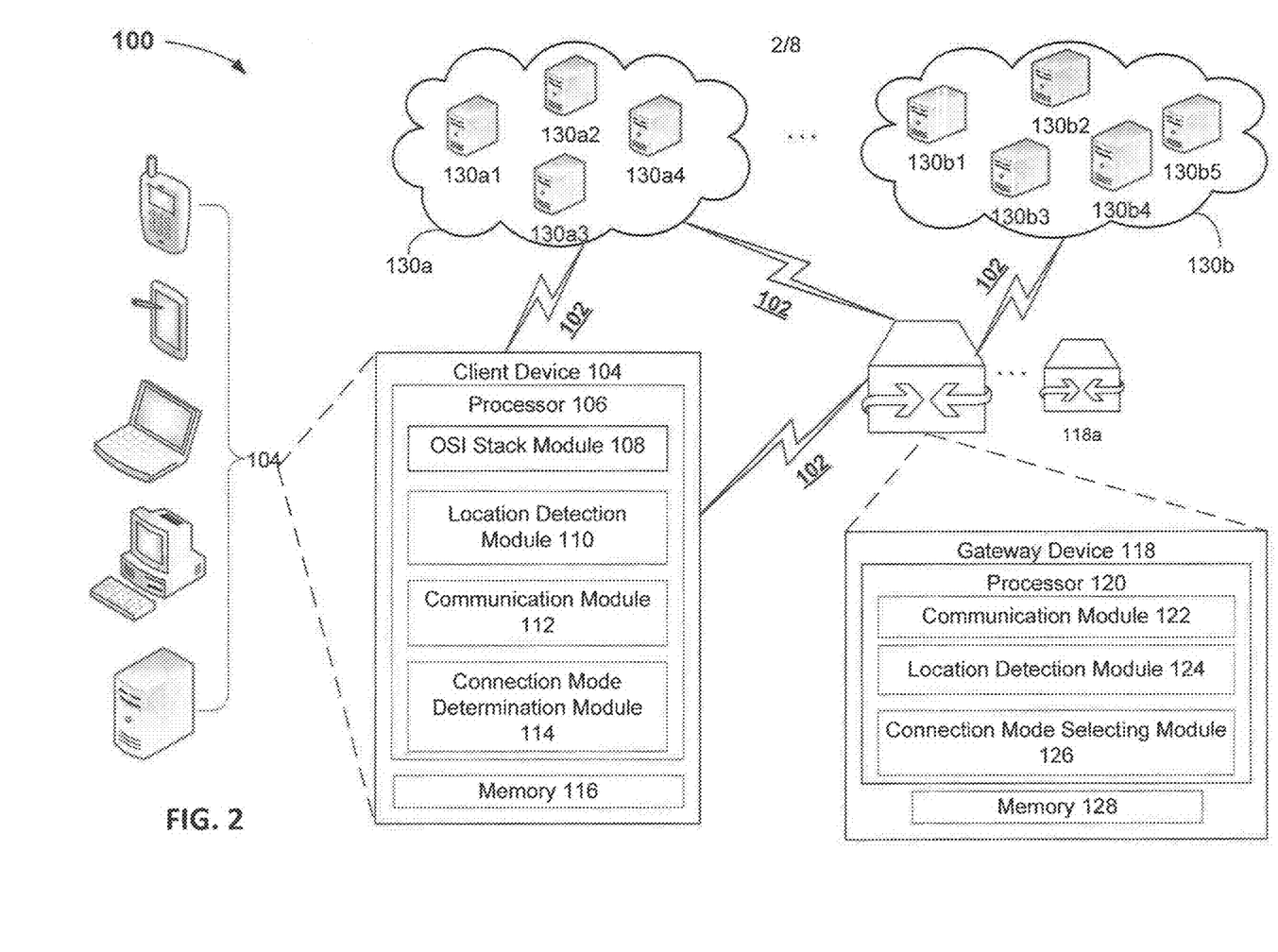
FIG. 2 illustrates a system for selecting and determining a connection mode between a client device and a server device within one or more communication networks according to an exemplary aspect.

FIG. 2 illustrates a system 100 for selecting and determining a connection mode between a client device and a server device, according to an exemplary aspect of the invention. More specifically, the system 100 may include a client computing device 104 configured to directly or indirectly access one or more local or remote server devices 130*a*1-*a*4 and 130*b*1-*b*5 to obtain various information and services. The client computing device 104 includes at least a processor 106 coupled to electronic memory 116. The processor 106 may be configured to execute a plurality of modules including an Open System Interconnection Reference Model (OSI) module 108, a location detection module 110, a communication module 112, and a connection mode determination module 114. The system 100 further includes a gateway device 118 configured to act as a proxy server between the client device 104 and one or more server devices 130*a*1-*a*4 and 130*b*1-*b*5. The gateway device 118 includes at least a processor 120 coupled to electronic memory 116. The processor 120 is configured to execute a plurality of modules including a communication module 122, a location detection module 124, and a connection mode selecting module 126. According to an exemplary aspect, the gateway device 118 may be configured to select a connection mode for client devices connected therewith and facilitate establishment of connections between client and server devices based on the selected connection mode.

As illustrated, a client computing device 104, which is generally a hardware and software based computing device, may be configured to access one or more server devices 130*a*1-4 and 130*b*1-5 deployed and located in one or more communication networks 130*a* and 130*b*, respectively. As will be explained fully below according to FIG. 10, the client computing device 104 may be one of personal computers, servers, laptops, tablets, mobile devices, smart phones, cellular devices, portable gaming devices, media players, network enabled printers, routers, wireless access points, network appliances, storage systems, gateway devices, or any other suitable devices that can access one or more server devices for various services.

It is to be appreciated that the system 100 may include any suitable and/or necessary interface components (not shown), which provide various adapters, connectors, channels, communication paths, to facilitate exchanging signals and data between various hardware and software components of the computing device 104 and any applications, peer devices, remote or local server systems/service providers, additional database system(s), and/or with one another that are available on or connected via underlying network connections 102 and associated communication channels and protocols (e.g., Internet, wireless, LAN, cellular, Wi-Fi, WAN). According to one aspect, the computing device 104 may act as a client device to access one specific server device (e.g., one of the server devices 130*a*1-4 and 130*b*1-5) directly through network connections 102 or via a gateway device 118 to obtain certain desired services.

The client device 104 is illustrated as having a hardware processor 106 coupled to an electronic memory 116 controlling and executing a plurality of modules including the OSI module 108, location detection module 110, communication module 112, and connection mode determination module 114. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

Among other features, the OSI stack module 108 of the client device 104 may be configured to facilitate various functionalities of the location detection module 110, communication module 112, and connection mode determination module 114. Although not explicitly shown, starting from the bottom layer of an OSI architecture, a physical layer of the OSI stack module 108 may define the electrical and physical specifications for device such as the pins, voltages, cable specifications, hubs, repeaters, network adapters, and other physical components. A data link layer may define the functional and procedural mechanisms to transfer data between network entities, and to detect and possibly correct errors that may occur in the physical layer. The data link layer may be capable of transferring data between nodes of a local area network or a wide area network and facilitating local delivery of data frames between devices.

A network layer may define the functional and procedural mechanisms for end to end data delivery including routing through intermediate hosts. In many networks, data may be organized into packets which may be routed through various network connections, gateways, routers, and other devices to a destination. The Internet Protocol (IP) is a typical example of a network layer operation. A configurable network layer function of the network layer 108e may modify the settings used by TCP/IP protocols to communicate within a local area network or a wide area network (e.g., communication networks 130a and 130b).

A transport layer of the OSI stack module 108 may define the functional and procedural mechanisms for transparent transfer of data between end users, which may provide reliable data transfer services to upper layers. The transport layer may control the reliability of a given link through flow control, segmentation or de-segmentation, and error control. The Transmission Control Protocol (TCP) and User Datagram Protocol (UDP) are two examples of protocols that may operate on a transport layer.

Further up the OSI architecture, a session layer of the OSI stack module 108 may control the dialogues or connections between devices, such as computers. The session layer may establish, manage, and terminate connections between a local and remote application. The session layer may also provide full duplex, half duplex, or simplex operation, and may establish check-pointing, adjournment, termination, and restart procedures. Some of the functions described above may be performed within the TCP protocol.

Next, a presentation layer and an application layer of the OSI stack module 108 are higher level layers that may deal with how data are manipulated by an application of the client device 104.

In one aspect, in order to determine a connection mode with a desired server device (e.g., one of the server devices 130a1-a4 and 130b1-b5), the client device 104 may be configured to detect its physical position directly or indirectly. That is, while the gateway device 118 may be located in a fixed position, the client device 104 may move around in a network. Hence, the client device 104 may call its location application program interface (API) to obtain a current position through global positioning system (GPS) or equivalent positioning accessory device attached to the client device 104. However, when the use of a location API may not be necessary, the client device 104 may be configured to communicate with its corresponding positioning accessory device directly.

Specifically, the client device 104 may compare its current position with its previous positions to detect whether it has moved from one location to another. The client device 104 may alternatively detect changes in the network portion of its IP address to determine that its location has changed. As shown in FIG. 2, the location detection modulation 110 may detect signals from a global positioning system using a GPS receiver (not shown) installed thereon. The GPS receiver, based on the signals from the global positioning system, may be configured by the physical layer of the OSI stack module 108 to detect the geographic location of the client device 104 and server devices 130a1-a4 and 130b1-b5 with a high degree of accuracy, to within a few feet, particularly when the GPS receiver has an unobstructed line-of-sight to the global positioning system, such as when outdoors.

Alternatively, the location detection module 110 may be configured to detect locations via a cellular radio device (e.g., cellular receiver, cellular transceiver) installed thereon. More specifically, the module 110 may be able to detect signals from one or more cell sites that provide information as to a geographic location of a client or server device within a communication network. That is, a geographic area may be associated with each cell site, with the geographic areas associated with various cell sites communicated to the client or server device from a central repository. These geographic areas may be determined according to calculations based on a cell site's broadcast strength, local geography, and other factors. These geographic areas may be determined according to sampling of which areas a cell site's transmissions may be detected.

The location detection module 110 may also detect locations via a Wi-Fi radio device (e.g., Wi-Fi receiver, Wi-Fi transceiver) installed thereon. Using the Wi-Fi radio device may use less power than using the GPS receiver on the client device 104 and may be performed simultaneously with the Wi-Fi radio device being used for network access via a Wi-Fi network, thereby reducing power usage. Wi-Fi triangulation, however, may not be possible in areas without Wi-Fi access points or where Wi-Fi access points have not been registered with associated geographic areas with a repository known to the client device 104.

Once the location information of the client device 104 has been obtained, the communication module 112 and connection mode determination module 114 may be configured to provide the initial configuration inputs to the configurable network layer functions of the network layer and/or the transport layer of the OSI stack module 108 by requesting information from other network entities in the underlying communication network directly or indirectly. For example, the communication module 112 may gather information and parameters from the gateway device 118 or other server and peer devices on behalf of the connection mode determination module 114 which subsequently sets up the various OSI layers that deal with network functions in response to detecting that a connection needs to be established between the client device 104 and one or more server devices 130a1-4 and 130b1-5. Thereafter, the communication module 112 may be configured to establish connections between the client device 104 and other network entities based at least upon a connection mode determined by the connection mode determination module 114. The connection mode determination module 114 may be an operating system function or an application that may be installed when the client device 104 joins a network. Such an application may be installed manually, by inserting a disk or other media into the device and performing an installation routine, or may be installed automatically by connecting to a local server or workgroup manager.

In one aspect, a direct connection may be established between client and server devices. Here, sending or receiving information directly or a direct connection between two devices may refer to information sent from one device directly to another device without being relayed or passed through the gateway device 118. However, one skilled in the art will understand that the direct connection between the client and server device may include various WI-FI access points, Ethernet hubs, routers and other typical network equipment. As will be described fully below in FIG. 5, the client device 104 may establish a direct connection with a domain name system (DNS) server device for the first time when no information of this DNS server device has been cached in the electronic memory 116 of the client device 104. For example, resources requested by the client device 104 from any server device may be identified by one or more identifying numbers, such as a MAC address, IP address, or domain name. To initiate communication with a resource identified by a domain name in a direct connection mode, the communication module 112 of the client device 104 may query a DNS server to resolve that domain name into an IP address. The DNS server, upon receiving a query, may find an IP address corresponding to that domain name, either through information available to it locally or by querying other DNS servers, and return the IP address to the client device 104. The client device 104 may then obtain the resource using the IP address directly via the DNS server.

The electronic memory 116 of the client device 104 may be configured to store information relating to pre-configured connection mode settings of, e.g., various OSI layers of the OSI stack module 108. For example, a look-up table may be generated and cached by the electronic memory 116 to store corresponding relationship between a domain name and an IP address of a prior connection mode. Moreover, configuration parameters of the network, transport, and session layers of the OSI stack module for each prior connection mode may also be stored at the electronic memory 116. As such, in response to a request to communicate with a server, the communication module 112 may first query the server to collect configuration information of a suitable connection mode between the client and server devices. Subsequently, the connection mode determination module 114 of the client device 104 may compare the collected configuration information with cached information in the electronic memory 116 to determine whether any prior established connection mode may be re-used to achieve a speedy connection set-up.

On the other hand, information relating to any new connection mode will be stored in the electronic memory 116 for future references.

According to another aspect of the invention, the connection mode of the client device 104 may be automatically selected and configured by the gateway device 118 for connecting the client device 104 with a server device either directly or indirectly through the gateway device 118 based at least in part on a current location and a presence of a pervious connection mode of the client device 104. Here, the client device 104 may be in a location where it can reach the gateway device 118, and the gateway device 118 is able to establish proxy connections to one or more server devices the client device 104 wishes to connect. The connection mode determination module 112 of the client device 104 may be an operating system function or an application that may be installed when the client device 104 joins a network. Such an application may be installed manually, by inserting a disk or other media into the device and performing an installation routine, or may be installed automatically by connecting to a local server or workgroup manager.

As illustrated in FIG. 2, the gateway device 118 may include a processor 120 coupled to an electronic memory 116 controlling and executing a plurality of modules to accept client device connections from multiple locations, and determine whether the client device 104 can reach one desired server device depending on a current location of the client device 104 from which a connection is accepted, as will be explained fully in connection with FIG. 3 below. According to an aspect, the plurality of modules of the gateway device 118 may include the communication module 122 for exchanging information and signals with various computing devices and systems, the location detection module 124, and the connection mode selecting module 126. In one aspect, multiple gateway devices 118a may be deployed in the system 100 to handle requests from various client devices 104.

Figure 3:
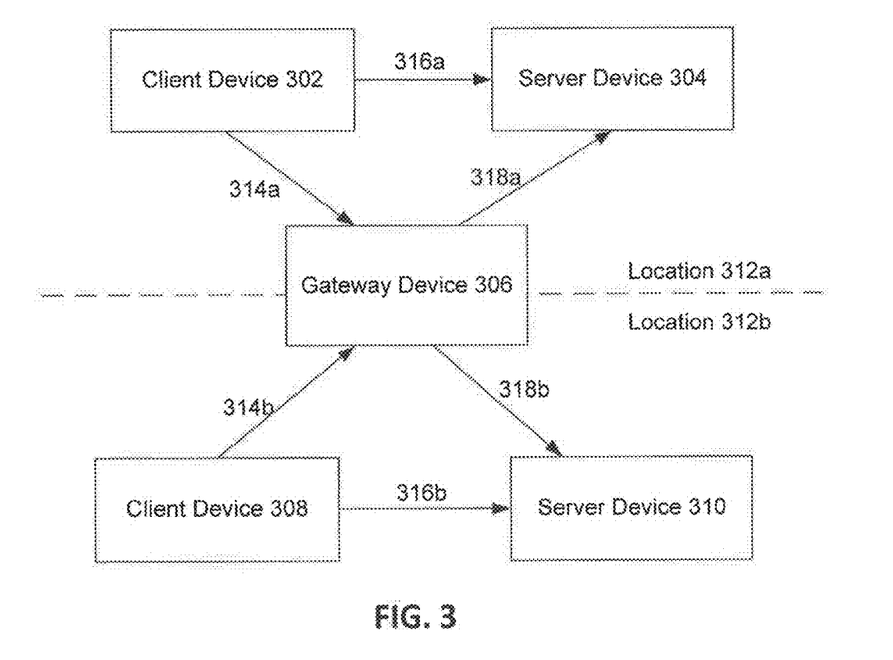
FIG. 3 illustrates a block diagram for selecting and determining a connection mode between a client device and a server device within one or more communication networks according to an exemplary aspect.

Referring now to FIG. 3, each of client devices 302, 308 may send a query 314a, 314b to the gateway device 306 to determine whether a corresponding desired server device 304, 310 is directly accessible via connections 316a, 316b, respectively. The gateway device 306 may inform the client devices 302, 308 whether a direct connection 316a, 316b is possible, such that the client devices 302, 308 may connect to the server device 304, 310 directly (i.e., not via the gateway device 306). The client devices 302, 308 may be free to move from one location 312b to another 312b, and the most suitable connection mode will be automatically determined by the gateway device 306 based on the current location of the client device in the network, according to aspects of the invention.

In one exemplary aspect, the connection mode of the client devices 302, 308 may be configured by the connection mode selecting module 126 of the gateway device 118, as shown in FIG. 2, when communicating with a corresponding server device for the first time. Subsequent connections to the same server device may be configured to use the previous connection mode setting when, for example, the location of the client device has not changed.

In one exemplary aspect, the location detection module 124 of the gateway device 118 may be configured to detect changes in the location of the client devices 302, 308 via, e.g., direct communication with respective location detection module 110.

Referring to FIG. 3, the gateway device 306 may determine the location of the client device 308 depending from which network the client device is connecting. For example, when connections (314a+318a) are received from network 312a, the gateway device 306 may be configured to determine that the client device 302 is on network 312a. The gateway device 306 may have multiple network interfaces or virtual LANs (VLANs) attached to various networks/locations being served. Thus, a client device's location may be obtained by at least detecting which interface/VLAN the connection is received by the gateway device 306. Alternative, the gateway device 306 may be configured to extract at least one network address from a connection's source IP address (which may be equivalent to the client device's IP) or the destination IP address (which may be equivalent to the gateway device's IP) to determine the client device's location.

Figure 4:
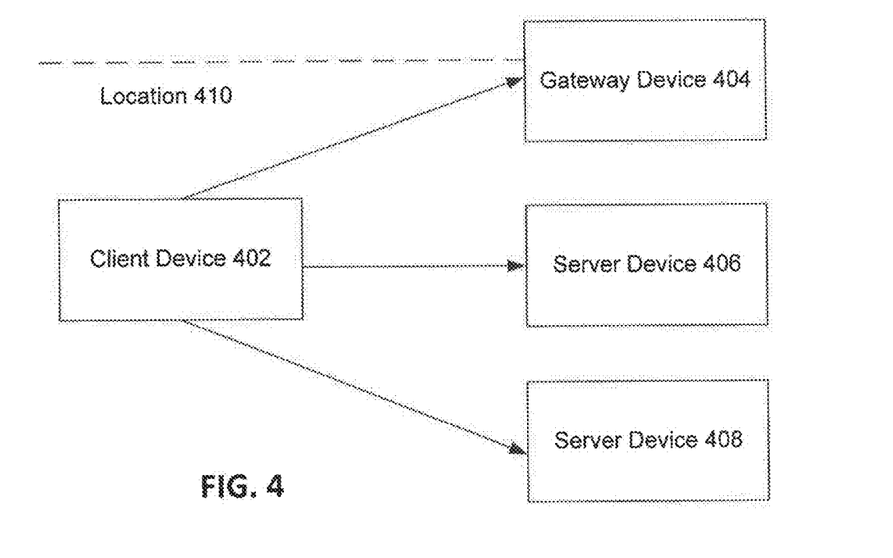
FIG. 4 illustrates a block diagram for selecting a connection mode and communicating between a client device and a server device within a same communication network according to an exemplary aspect.

Once a connection mode has been selected by the gateway device or determined by the client device for an initial communication with a desired server device, according to one aspect, referring to FIG. 4, the gateway device 404 may inform, via e.g., the communication module 122 of FIG. 2, the client device 402 whether the same connection mode can be cached at the client device 402 for communicating with other server devices 406, 408, or if a new query needs to be sent for each server device 406, 408. For example, a determined connection mode may be cached and re-used if all other server devices 406, 408 are in approximately the same location 410 with the client device 402 (e.g., client device and server devices located in the same subnet, LAN or WLAN). More specifically, the processor 120 of the gateway device 404 may execute the location detection module 124 to obtain information relating to current locations of the client device 402 and server devices 406, 408. In this case, there is no need for the client device 402 to send a query to the gateway device 404 for connecting with a new server device 408, since the connection mode is the same as used with the previous server 406.

Figure 5:
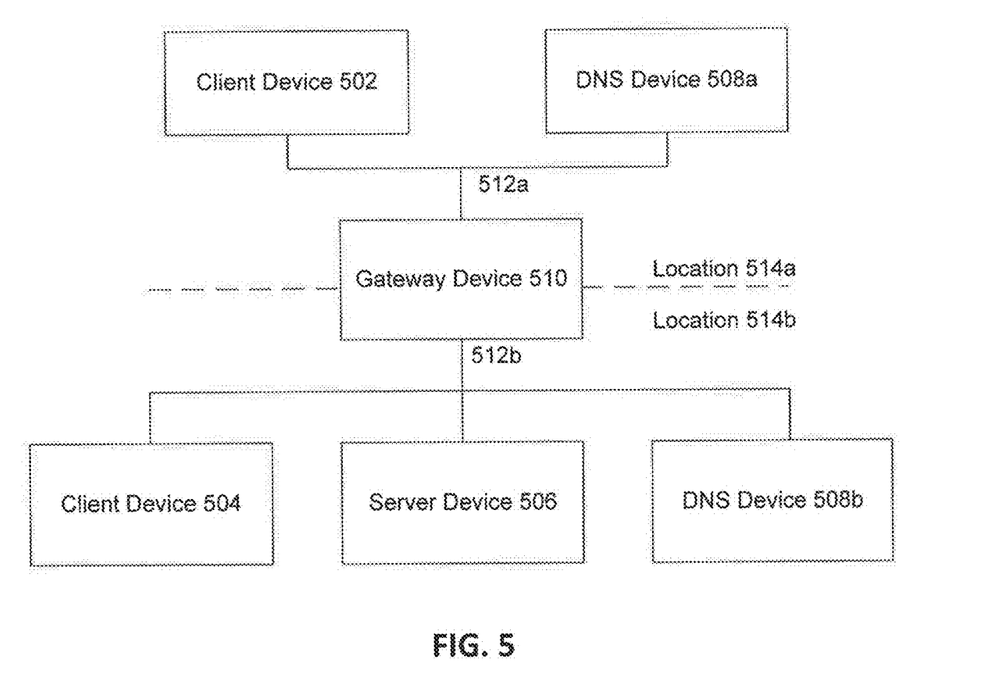
FIG. 5 illustrates a block diagram for selecting a connection mode and communicating between a client device and a server device using domain name server (DNS) devices according to an exemplary aspect.

Referring to FIG. 5, a gateway device 510 may be configured to obtain an assigned address (e.g., IP address) for each location 514a, 514b from which it accepts connections. Therefore, client device 502, 504 may use a directory service, such as a domain name server (DNS) device (e.g., one of the server devices 130a1-4 and 130b1-5 of FIG. 2), to obtain an address of the gateway device 510 which is reachable from the client device's current location. Hence, the gateway device 510 address may change according to the location from which each client device 502, 504 is connecting. As shown, the gateway device 510 may be assigned address 512a for a first location 514a, and address 512b for a second location 514b. These locations may represent different communication networks, such as an internal and external communication network. The client device 502 may be configured to connect to the gateway device 510 using its name and submit a query to the DNS device 508a to request services whenever it needs to obtain the IP address of the gateway device 510. As a result, when the client device 502 is in the first location 514a, DNS services provided by the corresponding DNS device 508a may return the address 512a, and when the client device 504 is in the second location 514b, the DNS device 508b may return the address 512b.

Generally speaking, a DNS address may point to a DNS, which is a technology used to resolve a device name with an address, typically an IP address. In some cases, a DNS server may resolve a device name using Internet Protocol version 4 (IPv4) addresses, Internet Protocol version 6 (IPv6) addresses, or some other addressing scheme. The default DNS address included in the gateway device 510 may point to a DNS server so as to allow a client device to, e.g., connect with the gateway device 510, automatically connect to the Internet, and be able to browse websites or access various hosts or devices on the Internet. Devices in a communication network that does not have a local DNS server may communicate via IP addresses for the other devices. In order to facilitate connections, a local DNS server device (e.g., DNS device 508a with respect to client device 502) may translate friendly names to the complex addresses, allowing the client device to refer to other devices using friendly names within the communication network. The local DNS server may gather friendly names from the various devices attached to the communication network, then respond to queries to resolve the names into network addresses.

A DNS server may be made available to client devices within a same communication network when the client devices detect the DNS server, then modify the network connectivity of these client devices' settings to add the local DNS server as a resource for resolving names.

In one aspect, discovery protocols, such as multicast DNS (mDNS), may be used to obtain a gateway device's address, as mDNS capabilities may be used to enable client devices to send DNS-like queries via IP multicast, and cooperatively collect answers to those queries in a useful manner. For example, the gateway device 510 may be configured to convert mDNS messages received from various client devices 502, 504 to suitable DNS messages, and transmit the DNS message to the DNS devices 508a, 508b in order to generate corresponding resource records (RRs). These RRs may be utilized by the DNS devices 508a, 508b using suitable DNS messaging to convey information included in the mDNS message to devices connected to other communication networks. Acting as a mDNS proxy, the gateway device 510 may transmit the converted mDNS message to the DNS devices 508a, 508b using dynamic DNS (DDNS). The mDNS proxy gateway device 510 may also include a database (not shown) for storing parameters associated with the mDNS messages and from which DNS and/or DDNS messages may be mapped, such as using a mapping tool other logical functioning element.

The mDNS-DDNS conversion may include mapping a name field of a mDNS message to a zone field of a DDNS message and finally to a name field of a DNS record, such that DNS devices 508a, 508b of domain names sufficient for use within a same communication network to locate all devices originating the same mDNS message. Additional mapping may also be used to apprise DNS devices 508a, 508b of a service type, service name or other service related information sufficient to convey capabilities of all device originating the same mDNS message.

Alternatively, a dynamic host configuration protocol (DHCP) may be used to automate the network connection mode configuration of client devices. For example, the client device 502 may request an address of the gateway device 510 from the DNS device 508a which uses DHCP. The information provided by the DHCP DNS device 508a may include a network address for the client device, a default gateway (e.g., the address of the gateway device 510), a subnet mask, and other information, such as time servers, domain name, and more. More specifically, the DHCP DNS device 508a may populate and maintain a database of local hostnames and addresses. The local hostnames and addresses may be gathered passively, for example by monitoring network communication between other devices, such as monitoring DHCP requests to identify devices that are joining a network or renewing licenses from the DHCP DNS device 508a. The DHCP DNS device 508a may also actively populate a database of local hostnames and addresses by actively querying other servers to retrieve address leases and the hostnames associated with each address lease.

In some examples, the DNS devices 508a and 508b may be a duplicate of a primary local DNS device, and may be used at times when the primary local DNS is offline or unavailable for any reason.

It should be appreciated that the gateway device 510 may also provide other services, such as Network Address Translation (NAT), firewall services, and other services such as Virtual Private Network (VPN).

Figure 6:
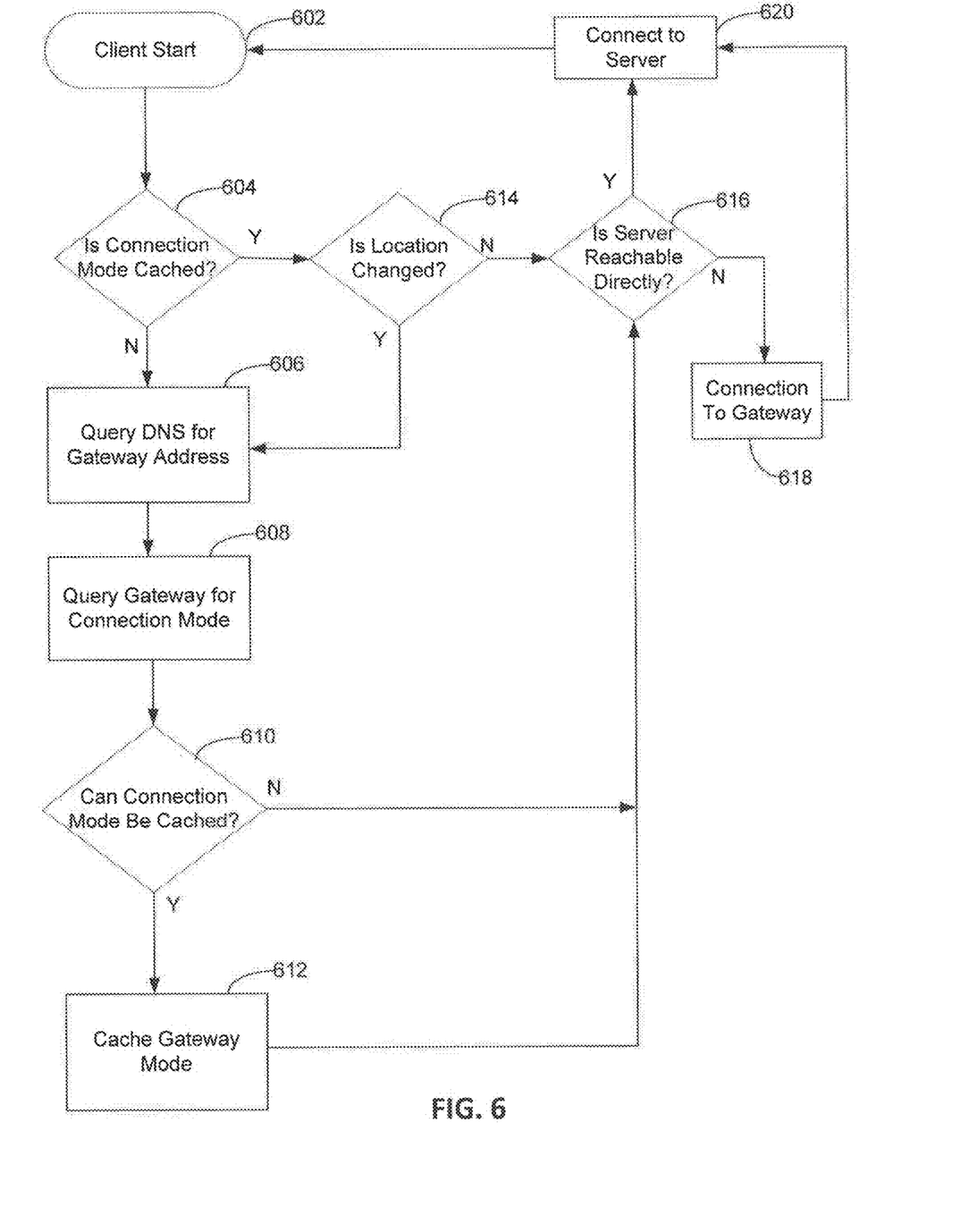
FIG. 6 illustrates a flow chart of a method implemented in a client device for determining a connection mode and communicating with a server device according to an exemplary aspect.

Referring to FIG. 6, a flow chart of a method implemented in a client device for determining a connection mode and communicating with a server device is illustrated, according to aspects of the invention. Initially, a client device, such as the client device 104 of FIG. 2 may start 602 and attempt to establish a connection with a desired server device to obtain certain information or services. The client device may use the connection mode determination module 114 to check 604 whether a previously determined connection mode for the client device has been cached in its electronic memory 116. For example, an address for the desired server device and the corresponding connection mode may be checked against all the appropriate layers in the OSI stack module 108 via a network layer function by the module 114. Here, the connection mode may refer to at least one of a direct connection between the client device and the desired server device, and an indirect connection via the gateway device between the client device and the desired server device. If no connection mode has been cached, the client device may query 606 a DNS device (e.g., DNS devices 508 or 508b of FIG. 5) to obtain an address of, e.g., the gateway device 510. Once obtained, the client device may query 608 the gateway device for a connection mode, which will be explained fully below in connection with FIG. 7. Thereafter, the connection mode determination module 114 of the client device may determine whether the connection mode received from the gateway device can be cached in, e.g., the electronic memory 116. If the connection mode cannot be cached, the client device may further determine 616 whether the desired server device can be accessed directly. A connection may be established directly 620 with the desired server device, or indirectly 618 via the gateway device, as a result.

However, if a connection mode has been cached and detected in the electronic memory 116 of the client device, a comparison between a current location and a previous location corresponding to the cached connection mode may be carried out 614. If no location change has been identified, the client device may determine 616 whether the desired server device can be accessed directly, such that a connection may be established directly 620 with the desired server device, or indirectly 618 via the gateway device.

On the other hand, if the current location is different from the previous location, the client device may query 606 a DNS device (e.g., DNS devices 508 or 508b of FIG. 5) to obtain an address of, e.g., the gateway device 510. The client device may then query 608 the gateway device via the obtained address for a connection mode, which will be explained fully below in connection with FIG. 7. Subsequently, the connection mode determination module 114 of the client device may determine whether the connection mode received from the gateway device can be cached in, e.g., the electronic memory 116. If the connection mode cannot be cached, the client device may further determine 616 whether the desired server device can be accessed directly. A connection may be established directly 620 with the desired server device, or indirectly 618 via the gateway device, as a result.

Figure 7:
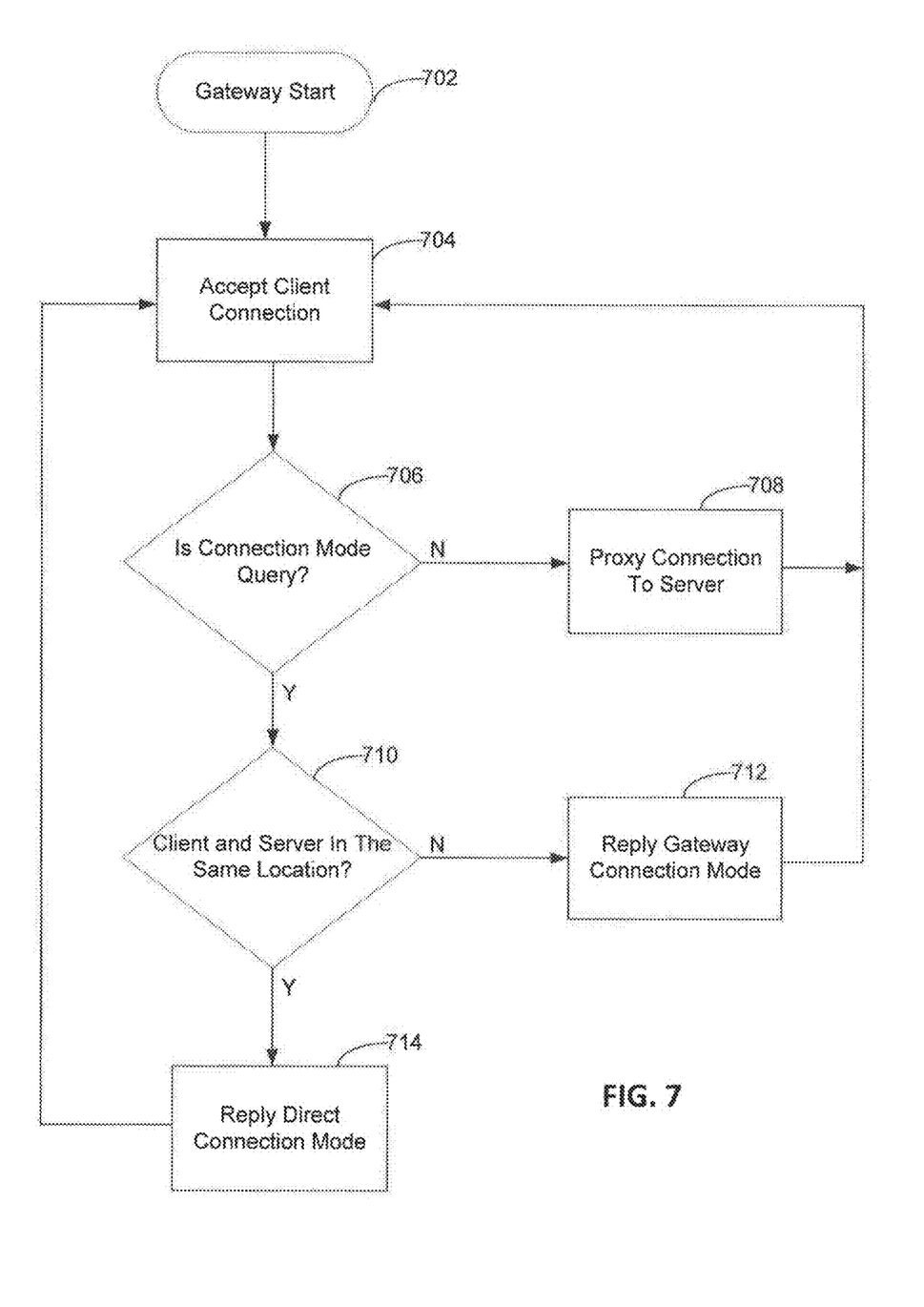
FIG. 7 illustrates a flow chart of a method implemented in a gateway device for selecting a connection mode and communicating between a client device and a server device according to an exemplary aspect.

Referring to FIG. 7, a flow chart of a method implemented in a gateway device for selecting a connection mode between a client device and a server device, according to aspects of the invention. Initially, a gateway device, such as the gateway device 118 of FIG. 2, may start 702 in response to receiving a connection request from a client device for accessing at least one desired server device. In accepting the request and establishing a connection with the client device 704, the gateway device may determine 706 whether the request relating to a connection mode query by the client device. Here, the connection mode includes at least one of a direct connection between the client device and the desired server device and an indirect connection via the gateway device between the client device and the desired server device. A proxy connection may be established 708 by the gateway device to the server device on behalf of the client device if the query is not a connection mode query. For example, the gateway device acting as a proxy server may receive an encrypted message from the client device that is addressed to the desired server device. Only the server and client are able to decrypt the message. Operating on behalf of the client device, the gateway device may forward the encrypted message to the server. Upon receipt, the server may decrypt the message, perform the task described in the message, encrypt the task performance results, and send the encrypted results back to the gateway device. The gateway device recognizes that the results are intended for the client and forwards the encrypted results to the client, where they can be decrypted and acted upon if necessary. To ensure secure connection therebetween, the gateway device may also provide a certificate to the client device so as to challenge the client for authentication.

In another aspect, to prevent hacking and unauthorized accessing of data over the Internet, the gateway device of the present application may also be implemented as at least one of: a SOCKS proxy configured to forward arbitrary data after a connection phase, a hypertext transfer protocol (HTTP) proxy, or a reverse proxy configured to protect a cluster of servers (e.g., servers 130a1-a4 and 130b1-b5) from discretionary access by client devices residing in the same network. The reverse proxy may protect the cluster of servers by forcing external clients to connect to individual servers within the cluster only through the reverse proxy. The reverse proxy itself may manage authentication, address translation and monitoring of data flowing through itself in order to ensure protocol integrity via supporting the HTTP protocol. For example, in order to facilitate exchanging audio and video data media streams between client and server devices on opposite sides, a HTTP tunneling may be implemented by the gateway device, which acts a reverse proxy, using an address mapping table for associating incoming requests to specific back-end server computing devices protected by the gateway device.

On the other hand, in response to a connection mode query, the gateway device may be configured to detect current locations of both the client and server devices using above-noted location detection techniques, or any other suitable technologies. If the client and server devices are identified to locate in approximately the same location or in a defined area of a same communication network, the gateway device may reply 714 a direct connection mode to the client device, such that the client device directly accesses the desired server device. For client and server devices that are identified to locate in dispersed or isolation locations from each other, the gateway device may reply 712 a gateway connection mode to the client device, such that the client device can access the desired server device via the gateway device. The connection mode selecting module 126 of the gateway device 118 may be an operating system function or an application that may be installed when the gateway device 118 joins a network. Such an application may be installed manually, by inserting a disk or other media into the device and performing an installation routine, or may be installed automatically by connecting to a local server or workgroup manager.

Figure 8:
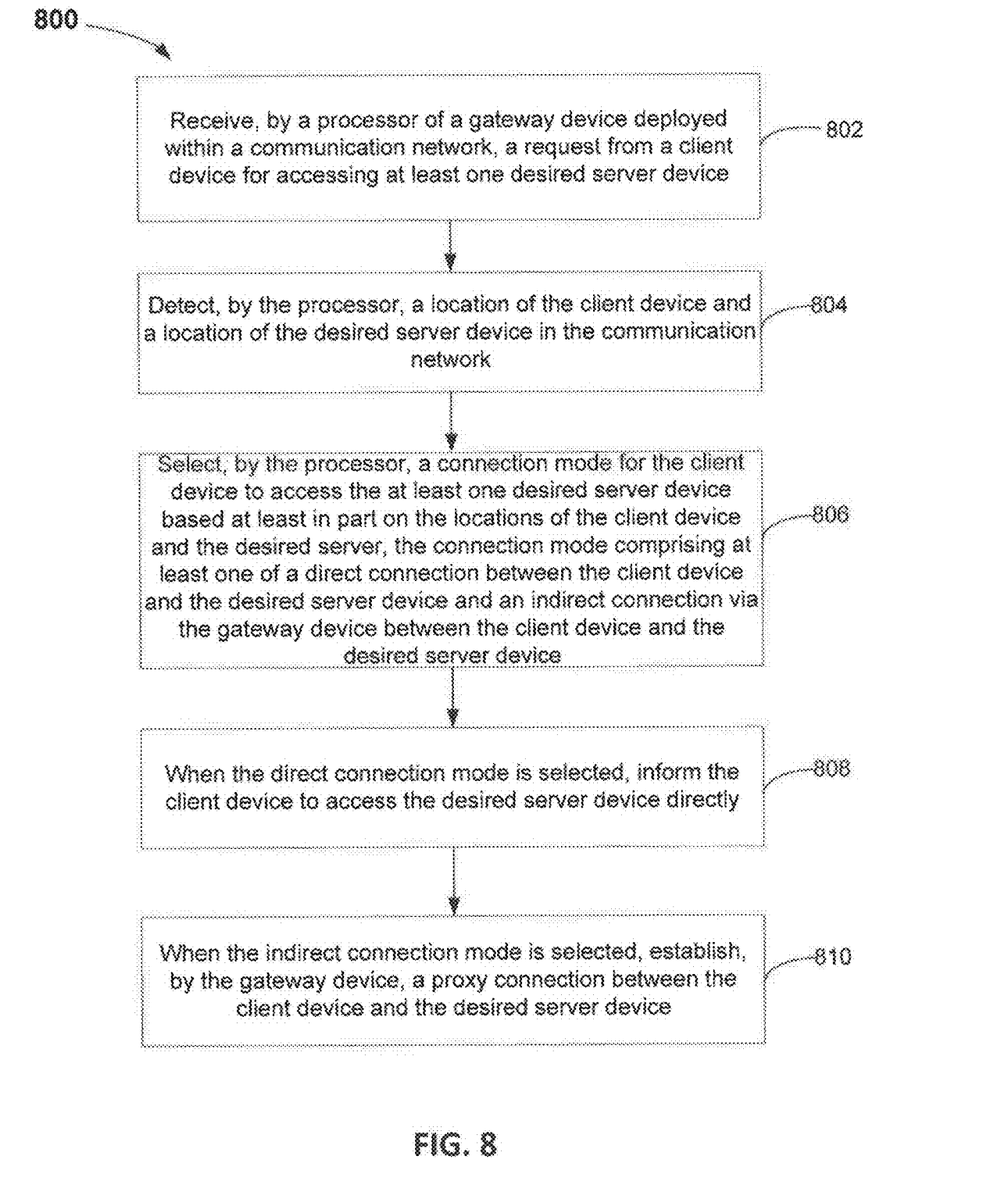
FIG. 8 illustrates a flow chart of a method implemented in a gateway device for selecting a connection mode between a client device and a server device according to an exemplary aspect.

FIG. 8 illustrates a flow chart of a method 800 implemented in a client device for determining a connection mode between a client device and a server device, according to exemplary aspects of the present invention. Initially at Step 802, the method comprises receiving, by a processor of a gateway device deployed within a communication network, a request from a client device for accessing at least one desired server device. Next, at Step 804, the method comprises detecting, by the processor, a location of the client device and a location of the desired server device in the communication network, respectively. At Step 806, the method 800 comprises selecting, by the processor, a connection mode for the client device to access the at least one desired server device based at least in part on the locations of the client device and the desired server device. The connection mode includes at least one of a direct connection between the client device and the desired server device, and an indirect connection via the gateway device between the client device and the desired server device. Continuing on to Step 808, the method 800 comprises informing the client device to access the desired server device directly when the direct connection mode is selected. However, when the indirect connection mode is selected, at Step 810, the method 800 comprises establishing, by the gateway device, a proxy connection between the client device and the desired server device.

Figure 9:
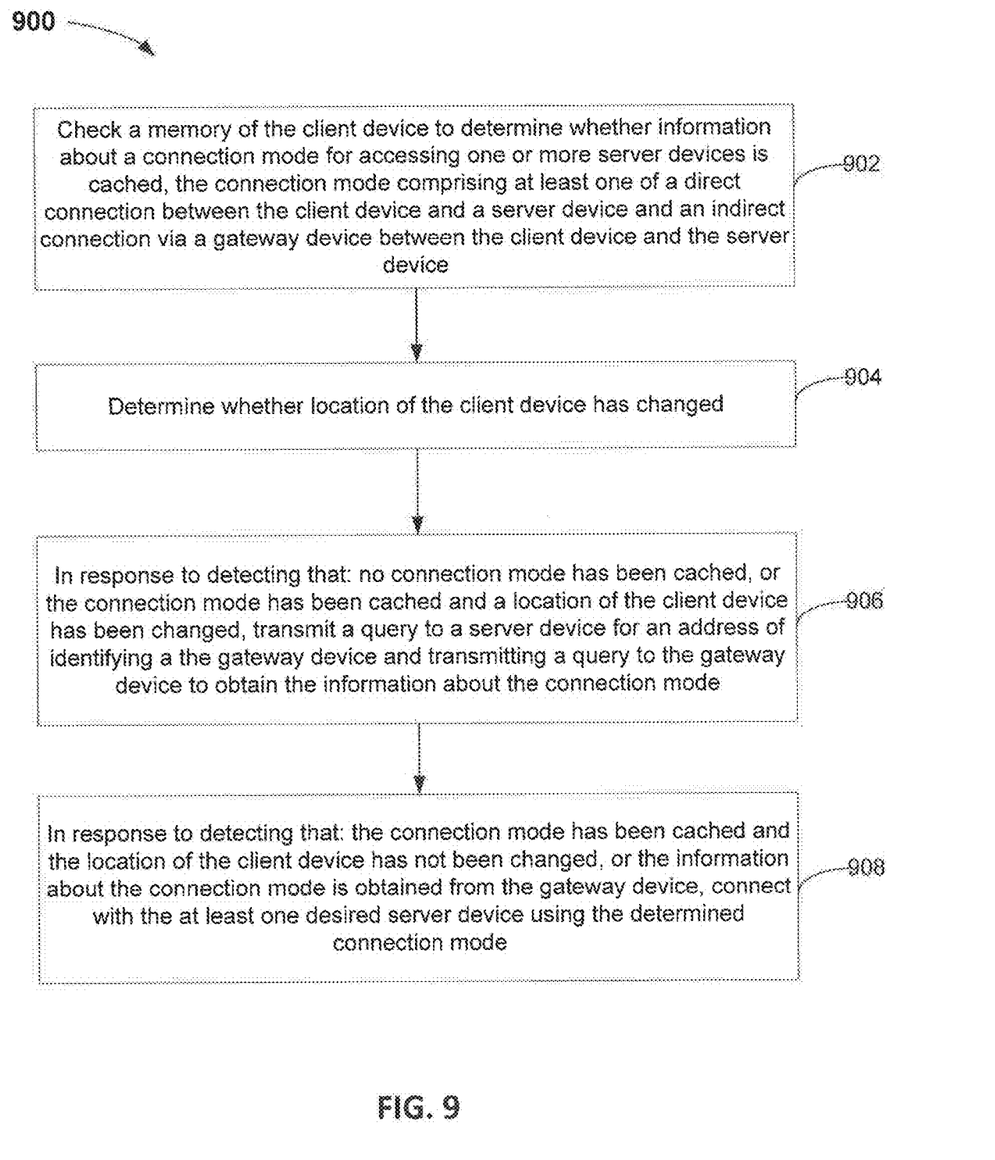
FIG. 9 illustrates a flow chart of a method implemented in a client device for determining a connection mode between a client device and a server device according to an exemplary aspect.

FIG. 9 illustrates a flow chart of a method 900 implemented in a client device for determining a communication mode between a client device and a server device, according to exemplary aspects of the present invention. Initially at Step 902, the method 900 comprises checking a memory of the client device to determine whether information about a connection mode for accessing one or more server devices is cached. The connection mode includes at least one of a direct connection between the client device and a server device, and an indirect connection via a gateway device between the client device and the server device. Next, at Step 904, the method 900 comprises determining whether a location of the client device has changed. In response to detecting that: no connection mode has been cached, or the connection mode has been cached and a location of the client device has been changed, at Step 906, the method 900 comprises identifying the gateway device and transmitting a query to the gateway device to obtain the information about the connection mode. On the other hand, in response to detecting that: the connection mode has been cached and the location of the client device has not been changed, or the information about the connection mode is obtained from the gateway device, at Step 908, the method 900 comprises connecting with the at least one desired server device using the determined connection mode.

Figure 10:
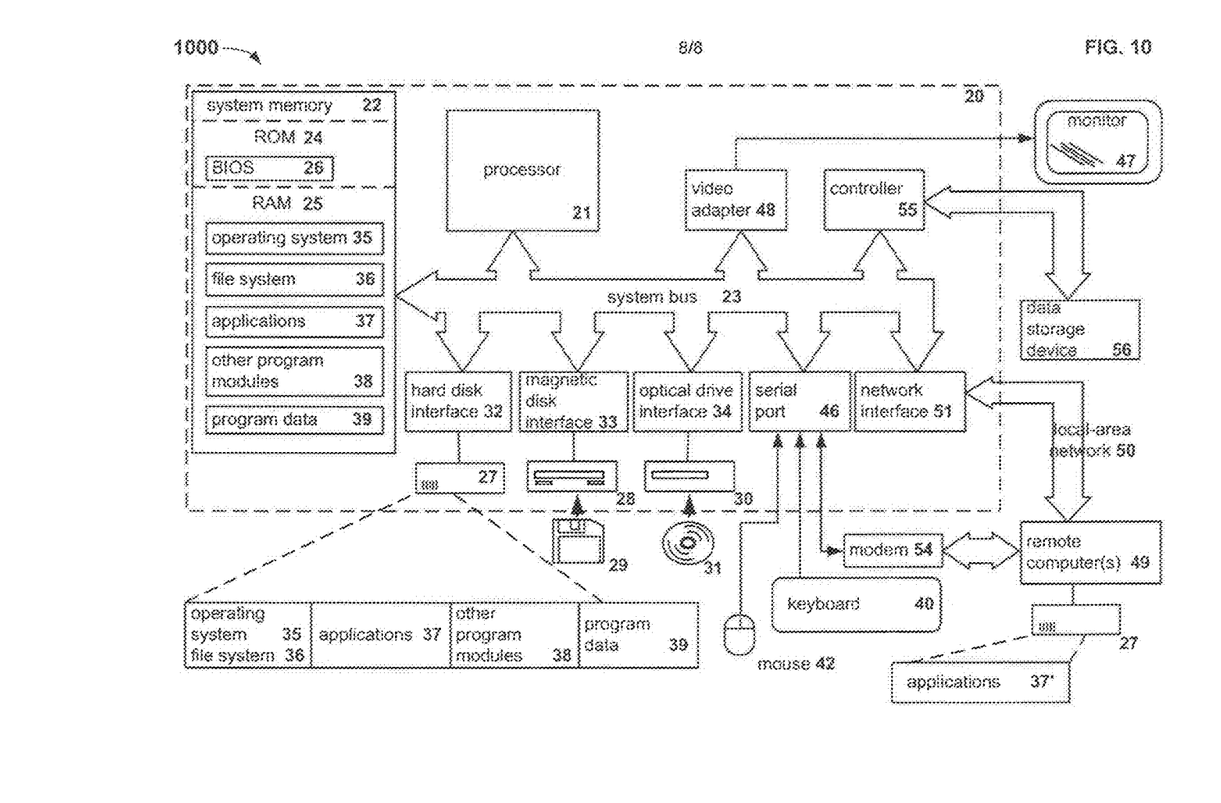
FIG. 10 illustrates an example computer system on which the disclosed systems and methods can be implemented.

FIG. 10 illustrates an example computer system (which may be the client device 104, the gateway device 118, or any of the servers 130*a*1-4, 130*b*1-5 in FIG. 2) on which the disclosed systems and method can be implemented according to an example aspect. The processor 21 of computer 20 may be configured to execute each of the OSI stack module 108, location detection module 110, communication module 112, connection mode determination module 114, and memory 116 of the client device 104, and the communication module 122, location detection module 124, connection mode selecting module 126, and memory 128 of the gateway device 118.

As shown in FIG. 10, the computer system 20 includes the processor or central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for selecting a connection mode, comprising:
  receiving a request from a client device to access one or more desired server devices;
  detecting a location of the client device and a location of the one or more desired server devices in a communication network;
  selecting a connection mode for the client device to access the one or more desired server devices based on the location of the client device and the one or more desired server devices;
  in response to a direct connection mode being selected, informing the client device to access the one or more desired server devices directly; and
  in response to an indirect connection mode being selected, establishing a proxy connection between the client device and the one or more desired server devices.

2. The method of claim 1, wherein a gateway receives the request from the client device and establishes the proxy connection between the client device and the one or more desired server devices.

3. The method of claim 1, further comprising:
  determining, whether a connection mode has been cached in a memory of the client device;
  in response to determining that no connection mode is cached, selecting a direct or indirect connection and caching the selected connection mode in the memory of the client device;
  in response to determining that a connection mode is cached determining that the location of the client device has changed from a previous location of the client device and reselecting a connection mode.

4. The method of claim 3, further comprising:
  determining whether the connection mode is cached by comparing an address for the one or more desired server devices and a selected connection mode with one or more layers in an OSI stack associated with the client device.

5. The method of claim 4, further comprising receiving an assigned address for each location from which the gateway accepts a connection, wherein the client device is configured to obtain the assigned address of the gateway from the location of the client device via a directory service or service discovery protocols.

6. The method of claim 1, further comprising:
  detecting location changes of the client device by at least detecting network interfaces or virtual LANs via which the request is received from the client device, or extracting at least one network address from a source IP address or a destination IP address of the direct or indirect connection.

7. The method of claim 1, further comprising:
  determining whether the connection mode is to be cached for the client device communicating with other server devices within the communication network, or whether a new query is required to be sent by the client device to the gateway for each of the other server devices;
  in response to detecting that the client device attempts to access one of the other server devices co-located with the client device within a selected area of the communication network, instructing the client device to communicate with the one of the other server devices using the direct connection mode; and
  in response to detecting that the client device attempts to access one of the other server devices that locate in a different location area of the communication network than that of the client device, instructing the client device to communicate with the one of the other server devices via the gateway.

8. A system for selecting a connection mode, comprising:
  a hardware processor configured to:

receive a request from a client device to access one or more desired server devices;

detect a location of the client device and a location of the one or more desired server devices in a communication network;

select a connection mode for the client device to access the one or more desired server devices based on the location of the client device and the one or more desired server devices;

in response to a direct connection mode being selected, inform the client device to access the one or more desired server devices directly; and in response to an indirect connection mode being selected, establish a proxy connection between the client device and the one or more desired server devices.

9. The system of claim 8, wherein a gateway receives the request from the client device and establishes the proxy connection between the client device and the one or more desired server devices.

10. The system of claim 8, wherein the hardware processor is further configured to:

determine, whether a connection mode has been cached in a memory of the client device;

in response to determining that no connection mode is cached, select a direct or indirect connection and caching the selected connection mode in the memory of the client device;

in response to determining that a connection mode is cached, determine that the location of the client device has changed from a previous location of the client device and reselect a connection mode.

11. The system of claim 10, wherein the hardware processor is further configured to:

determine whether the connection mode is cached by comparing an address for the one or more desired server devices and a selected connection mode with one or more layers in an OSI stack associated with the client device.

12. The system of claim 11, wherein the hardware processor is further configured to:

receive an assigned address for each location from which the gateway accepts a connection, wherein the client device is configured to obtain the assigned address of the gateway from the location of the client device via a directory service or service discovery protocols.

13. The system of claim 8, further comprising:

detect location changes of the client device by at least detecting network interfaces or virtual LANs via which the request is received from the client device, or extracting at least one network address from a source IP address or a destination IP address of the direct or indirect connection.

14. The system of claim 8, further comprising:

determine whether the connection mode is to be cached for the client device communicating with other server devices within the communication network, or whether a new query is required to be sent by the client device to the gateway for each of the other server devices;

in response to detecting that the client device attempts to access one of the other server devices co-located with the client device within a selected area of the communication network, instruct the client device to communicate with the one of the other server devices using the direct connection mode; and in response to detecting that the client device attempts to access one of the other server devices that locate in a different location area of the communication network than that of the client device, instruct the client device to communicate with the one of the other server devices via the gateway.

15. A non-transitory computer-readable medium for selecting a connection mode, comprising:

receiving a request from a client device to access one or more desired server devices;

detecting a location of the client device and a location of the one or more desired server devices in a communication network;

selecting a connection mode for the client device to access the one or more desired server devices based on the location of the client device and the one or more desired server devices;

in response to a direct connection mode being selected, informing the client device to access the one or more desired server devices directly; and in response to an indirect connection mode being selected, establishing a proxy connection between the client device and the one or more desired server devices.

16. The medium of claim 15, wherein a gateway receives the request from the client device and establishes the proxy connection between the client device and the one or more desired server devices.

17. The medium of claim 15, further comprising:

determining, whether a connection mode has been cached in a memory of the client device;

in response to determining that no connection mode is cached, selecting a direct or indirect connection and caching the selected connection mode in the memory of the client device;

in response to determining that a connection mode is cached determining that the location of the client device has changed from a previous location of the client device and reselecting a connection mode.

18. The medium of claim 17, further comprising:

determining whether the connection mode is cached by comparing an address for the one or more desired server devices and a selected connection mode with one or more layers in an OSI stack associated with the client device.

19. The medium of claim 18, further comprising receiving an assigned address for each location from which the gateway accepts a connection, wherein the client device is configured to obtain the assigned address of the gateway from the location of the client device via a directory service or service discovery protocols.

20. The medium of claim 15, further comprising:

determining whether the connection mode is to be cached for the client device communicating with other server devices within the communication network, or whether a new query is required to be sent by the client device to the gateway for each of the other server devices;

in response to detecting that the client device attempts to access one of the other server devices co-located with the client device within a selected area of the communication network, instructing the client device to communicate with the one of the other server devices using the direct connection mode; and in response to detecting that the client device attempts to access one of the other server devices that locate in a different location area of the communication network than that of the client device, instructing the client device to communicate with the one of the other server devices via the gateway.

* * * * *